Aug. 12, 1930.  C. T. HIBBARD  1,772,566
STARTING SYSTEM FOR SYNCHRONOUS MOTORS
Filed Nov. 23, 1926  2 Sheets-Sheet 1

INVENTOR
Charles Truman Hibbard
BY
ATTORNEYS

Patented Aug. 12, 1930

1,772,566

UNITED STATES PATENT OFFICE

CHARLES TRUMAN HIBBARD, OF MINNEAPOLIS, MINNESOTA, ASSIGNOR TO ELECTRIC MACHINERY MFG. COMPANY, OF MINNEAPOLIS, MINNESOTA, A CORPORATION OF MINNESOTA

STARTING SYSTEM FOR SYNCHRONOUS MOTORS

Application filed November 23, 1926. Serial No. 150,226.

This invention relates to starting systems for electric motors, particularly to starting systems for synchronous motors, and contemplates the changing, during the accelerating period of the motor, of the value of the field discharge resistance, to thereby improve the starting characteristics of the machine.

When a synchronous motor is at standstill it has many of the essential properties of a transformer. If an alternating current is supplied to the armature terminals, an alternating current flows in the armature winding, inducing a secondary voltage in the motor field coils. At the instant of starting, this secondary voltage has the same frequency as the line voltage, but as the motor comes up to speed the frequency decreases, becoming zero at synchronous speed. The induced voltage is very high at the start, but as the motor accelerates the voltage decreases with declining frequency.

The general practice has been to start synchronous motors with either an open field circuit or a closed field circuit, depending somewhat upon the design of the machine. The open field method has the disadvantage of causing excessively high voltage strains to be imposed upon the field coil insulation because of the inductive action of the armature on the field coils. The closed field method is usually employed in conjunction with a field discharge resistance so that the induced current of the field can circulate in the field circuit, thereby avoiding the high voltage strain on the field insulation.

Generally, it is true that a larger starting torque will be obtained by starting a motor with an open field than with a closed field, and conversely, a larger pull-in torque will be obtained by employing a field closed through a discharge resistance of low value. A somewhat contradictory relation thus exists between the starting and pull-in torques of a motor and the value of the field discharge resistance. The employment of a high resistance at starting to gain the advantage of high starting torque will adversely effect the pull-in torque when the motor is ready to pull into step. If a large starting torque is not as important in a particular installation as a large pull-in torque, a low discharge resistance may be employed, but a low resistance has the serious disadvantage of impairing the power factor during starting, resulting in a greater kv-a input and lower torque.

One of the objections to starting synchronous motors with a low field discharge resistance is the excessive kv-a drawn from the line to the serious disadvantage of the other customers supplied by the power line. The drain of kv-a causes a disturbance of the line voltage that is transmitted to all parts of the system, and the power factor is materially reduced. When a number of motors are thrown on the line in succession the resulting regulation falls far below the value ordinarily necessary for proper and efficient operation.

In order to overcome the objectionable features and disadvantages above outlined, I have devised a method and apparatus for varying the field discharge resistance during the starting period at one or more instances at which a change in the value of the resistance will bring out the best operating characteristics inherent in the motor.

According to my invention, the motor can be started with a high starting torque by using a high field discharge resistance or by having the field circuit open. The starting kv-a will thus be considerably lower than that required for low resistance starting and the torque will be correspondingly higher. The ratio of starting torque to the kv-a drawn from the line will therefore be greater than for any lower value of field discharge resistance and the disturbance of the line will be very small compared with that caused by starting the motor with a low discharge resistance. As the motor speed increases, the value of the resistance may be changed one or more times depending upon the results to be obtained. By progressively reducing the field discharge resistance as the motor approaches synchronism, the condition for best pull-in torque, i. e., low discharge resistance, will ultimately be obtained and the motor will have a very much higher pull-in torque than it would have if the discharge resistance were not changed.

In some instances it may be desired to start the motor with an open field instead of a discharge resistance of high value. The motor may thus be started so as to derive the benefit of the maximum starting torque and after it has reached a certian speed the field may be closed through a proper value of discharge resistance. After the field has been closed on the discharge resistance the value thereof may be varied, as above described, to obtain the best pull-in torque.

To permit of the field discharge resistance being changed at the proper instant at which a change will produce beneficial results, I propose to employ a suitably constructed relay or relays responsive to the electrical condition of the field. Since the declining frequency of the voltage and current in the field provides an exact criterion of the condition of the motor during the accelerating and pull-in period, I may so construct the relays that they will operate at different points during the starting period when the frequency of the field indicates that a change will be beneficial.

If the motor is started with an open field a frequency responsive relay would not be operative but a time relay or a relay actuated by a speed device or a relay actuated by a decrease of line current may be employed to close the field on a suitable value of discharge resistance at the proper instant. Since a variation in the load of the motor would change the starting time and the line current, a time relay or a current relay would not be as sensitive to the actual condition of the motor as a speed relay. A voltage relay, actuated by the induced voltage of the field could also be used for this purpose.

Instead of automatic means dependent upon the electrical condition of the motor I may employ manually operated switches adapted to cut in or cut out suitable values of field discharge resistance. In such case, the operation of the switches would depend upon the accuracy with which the actual condition of the motor could be ascertained by the attendant in charge of the manually operated devices.

Other provisions and features of my invention, as well as those already discussed, will be better understood by considering the following detailed description which is to be taken in conjunction with the accompanying drawings wherein—

Figure 1:
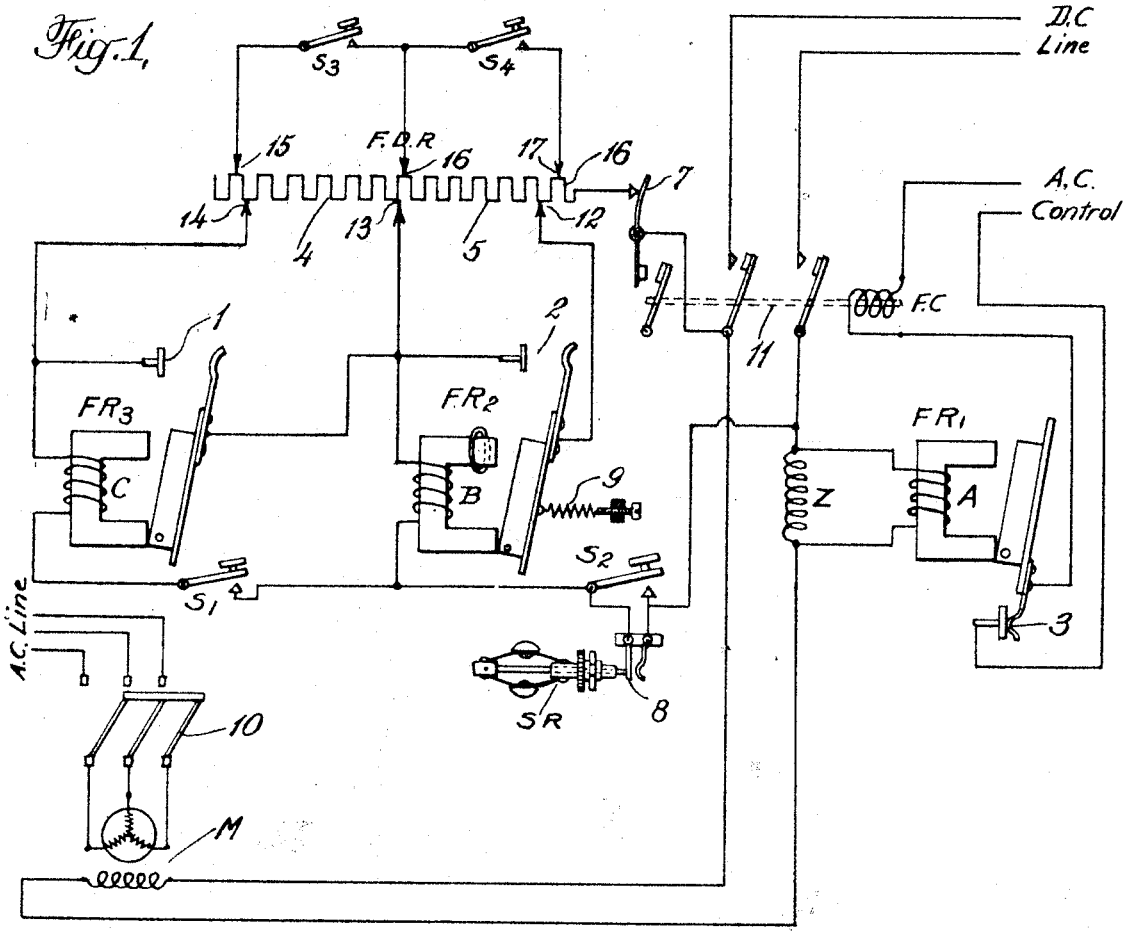
Fig. 1 is a circuit diagram of one embodiment of my invention.

In the embodiment of my invention illustrated in Fig. 1 the armature winding of a motor M is supplied with alternating current from the A—C line through the connecting switch 10. The single phase field winding of the motor can be connected to a source of excitation current through the switch 11, which is actuated by an electromagnetic control coil FC energized by current drawn from a suitable A—C source. A relay $FR^1$ responsive to the electrical condition of the motor field is included in the field circuit during starting and controls a contact 3 in the circuit of the magnetic switch coil FC.

Upon closing the line switch 10, alternating current will be supplied to the armature winding of the motor and the motor will start. As the motor starts an induced current will flow through the field circuit provided the motor is started with a closed field circuit. If the motor is started with an open field no current will flow and a high voltage will be built up in the field coils.

Assuming for the moment that the motor is started with a closed field, the induced current will flow from one terminal of the field, through the contact 7, the field discharge resistance FDR, the contact 14, the coil C of the relay $FR^3$, the closed switch $S_1$, the closed switch $S_2$, the reactance Z of the relay $FR^1$ and back to the other terminal of the field. The reactance Z has a resistance and inductance so proportioned with respect to the coil A of the relay $FR^1$, that currents of high frequency will be diverted through the coil A while currents of low frequency will flow directly through the reactance itself, and, accordingly, the relay $FR^1$ will open the instant an induced current flows in the field circuit. The contact 3 will therefore open and the circuit of the coil FC will be broken to keep the switch 11 in open position.

The amount of discharge resistance through which the induced current flows depends upon the value of discharge resistance it is desired to employ during starting. If a high value of resistance is desired, the entire FDR between the contact 7 and the contact 14 may be used. In such case the manually operable switch $S_1$ is closed to include the coil C of the relay $FR^3$. If this switch is left open, the current will pass through FDR from contact 7 to contact 13 and then through coil B of a relay $FR^2$ thereby leaving the portion 4 of the resistance out of circuit. The manually operable switch $S_2$ is employed to short circuit contacts 8 of a speed relay device SR, as will be explained later, and is left closed for all conditions of starting for which the relay SR is not used.

As the motor comes up to speed, the decreasing frequency of the induced current flowing through the coil C of the relay FR³ will reach the value at which the relay is designed to operate. The particular point in the operation of the motor for which the relay is designed to operate depends upon the construction of the motor and the local conditions of load and operation conditions. Several test runs of the motor should be sufficient to adjust the relay for a particular point of operation. When the proper point of operation is reached the relay will be actuated to close a contact 1 thereby short-circuiting the portion 4 of the field discharge resistance FDR.

The short circuiting of the portion 4 reduces the value of the discharge resistance in circuit with the field and the current flows through contact 13 and coil B of relay FR². The relay FR² may be of the same general frequency type as FR³ or it may be provided with additional adjustment features to permit of more sensitive operation. Since relay FR² is also in circuit during the time relay FR³ is in circuit, and in series with a lower value of discharge resistance than is relay FR³, some current will flow through the coil B while the greater part is flowing through coil C. The coils B and C are so constructed that during the time the relay FR³ is in circuit the coil B has a greater impedance than coil C. As a result the greater portion of the current flows through coil C. However, to prevent the current passing through coil B from actuating the relay FR², a choking or damper ring is provided on one of the poles of the relay to keep it from closing at high frequencies. A retarding tension spring 9 may also be provided to adjust the relay armature to close only when the frequency has reached a point at which it is desirable to actuate the relay. Other means such as variation of the air gap and variation of the strength of the actuating coil B may also be employed to properly adjust the relay.

When the frequency reaches the value for which the relay FR² is set, the relay will close and contact 2 will be established to short circuit portion 5 of the discharge resistance. The field circuit will then be from one terminal of the field, through contact 7, portion 16 of the discharge resistance, contact 12, contact 2, coil B, switch S₂, reactance, Z and back to the other field terminal. The portion 16 of the discharge resistance may be very small compared with the value of portions 4 and 5, it being only large enough to prevent serious arcing of the field contact 7 when the field is thrown over to the D—C supply by the action of the relay FR¹.

As the motor approaches synchronism, the frequency of the induced field current will fall still lower and at a predetermined value will actuate relay FR¹ to close contact 3 and energize coil FC, whereby the field switch 11 will be closed and the contact 7 opened and the field connected to the source of excitation current.

The motor is thus brought up to synchronism and thrown on the line by the successive operation of the relays FR³, FR² and FR¹. During the starting period the discharge resistance of the field is varied to obtain the best operation of the motor at substantially all points between starting and synchronism.

If instead of starting the motor with a high discharge resistance and closed field it is desired to start it with an open field, a speed relay SR may be utilized to insert a suitable value of field discharge resistance at a point at which it is advantageous to change from an open to a closed field. The switch S₂ is left open, thus opening the field, and the relay SR actuated when a suitable speed is reached. The actuation of the relay SR closes contact 8 and closes the field circuit through the discharge resistance, which may comprise either the entire FDR or merely the portions 16 and 5, depending upon whether the switch S₁ is closed or open. The amount of resistance inserted in the field circuit after the circuit is closed depends upon the characteristics of the particular machine to which the system is applied. After the field is once closed, the procedure of reducing the resistance in successive steps is the same as before.

Figure 2:
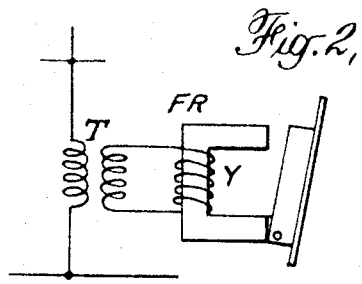
Figs. 2, 3 and 4 are diagrams illustrating various forms of connecting a control relay in the system.
Figure 3:
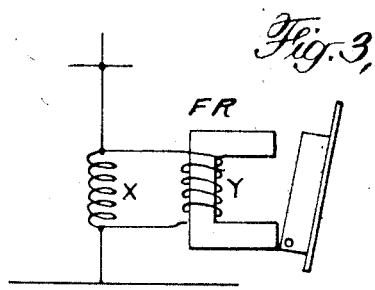
Figure 4:
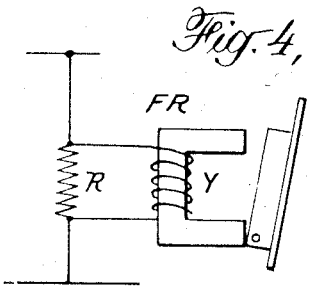

The relays employed in the control system need not be of the type illustrated in Fig. 1. The coil of the relay may be connected in circuit inductively, as shown by the transformer T and coil Y of Fig. 2. Or, the coil Y of the relay may be in parallel with either a reactance X as indicated in Fig. 3 or a resistance R as shown in Fig. 4. In all cases, the operation of the relay depends upon the electrical condition of the field circuit, regardless of whether it closes immediately as is the case with FR¹ or after an interval of time as is the case with FR² or FR³.

In some instances it may be feasible to operate the changes in discharge resistance by manually operable means, such as switches S₃ and S₄. Instead of relays being connected to various sections of discharge resistance, manually operable switches may be connected at points 15, 16 and 17. When it is desired to short circuit the portion 4 of the resistance, the switch S₃ is closed, and when the portion 5 is to be cut out of circuit, the switch S₄ is closed. The variations in field discharge resistance may thus be effected by manual means as well as by automatic means, and for some installations it may be desirable to employ both means as a protective measure to prevent shutting down of the motor due to a failure of the automatic means.

Figure 5:
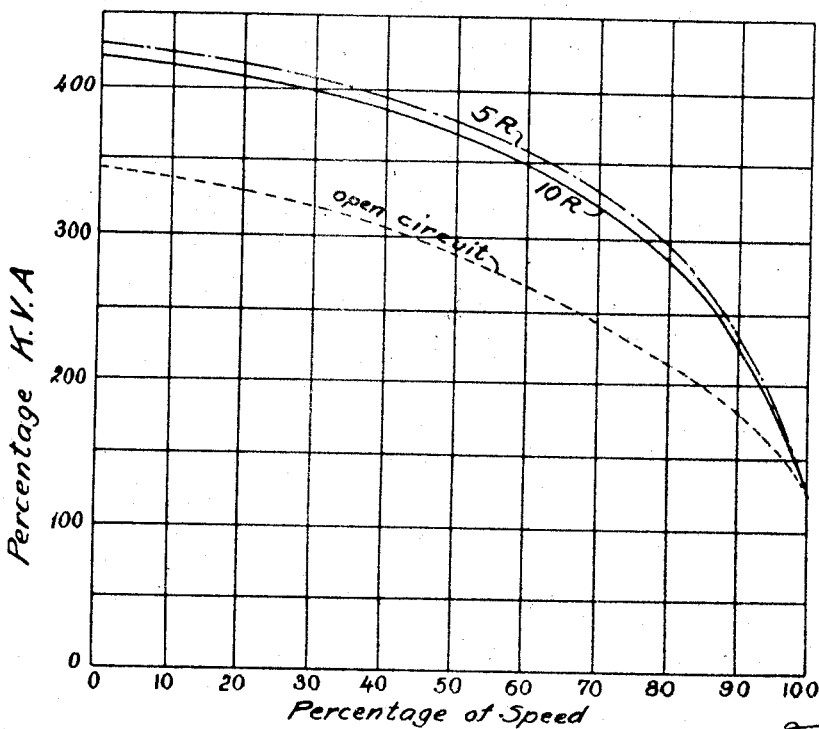
Fig. 5 is a chart showing the kv-a curves for various values of discharge resistance.

By providing means for varying the field discharge resistance during the starting period I am enabled to effect a considerable reduction in the kv-a drawn from the line at starting, as illustrated in Fig. 5. The curves 5R and 10R indicate the kv-a drawn from the line by a motor employing a discharge resistance of, respectively, 5 and 10 times the value of the field resistance. The open circuit curve is self explanatory. The wide difference in the value of kv-a at low speed between the open circuit curve and the 5R curve indicates the desirability of employing as high a resistance as possible at the instant of starting. As the motor gains speed the difference becomes less, so that a change from open circuit to some value such as 10R will not result in any considerable increase in kv-a.

Figure 6:
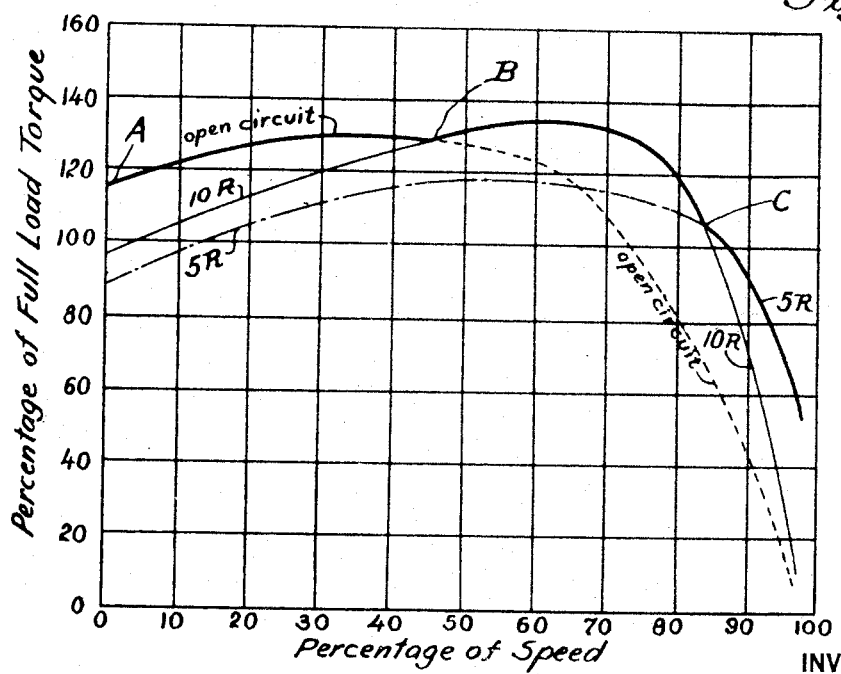
Fig. 6 is a chart showing the manner in which my improved method may be employed to obtain the best operating characteristics during the starting period of a motor.

The torque developed by a motor using various values of field discharge resistance, is shown in Fig. 6. The 5R, 10R and open circuit curves apply to the same conditions as those explained in connection with Fig. 5. The main feature of the chart is the relation between starting and pull-in torque and the value of discharge resistance. Thus, the open circuit curve indicates the highest starting torque but the lowest pull-in torque which, for purposes of description, may be considered to occur at approximately 95% of synchronous speed. The 5R curve, on the other hand, has the lowest starting torque and the highest pull-in torque, while the 10R curve possesses values falling somewhere between the other two.

If, as according to my invention, the field is started on very high discharge resistance, or open circuit, the torque developed will be along the heavy curve from A to B. At B, the developed torque is less than that obtainable with a discharge resistance of 10R, therefore the field is closed on a discharge resistance of 10R. The torque now developed will be along the heavy curve from B to C. At C the developed torque is less than that obtained with a resistance of 5R, therefore the discharge resistance is reduced again. The torque will then follow the heavy line from C to the point of pull in, which occurs at about 95% of synchronous speed.

By interpolation from the chart, the value of torque developed at 95% speed, or pull-in, on the heavy 5R curve is about 70% of the full load torque of the machine. The value of the torque developed on the 10R curve is about 35%, while that of the open circuit curve is about 20%. The reduction of the discharge resistance from 10R to 5R therefore results in an increase of pull-in torque of approximately 100%. Similarly, an increase of the resistance from 5R to open circuit at starting increases the starting torque from about 90% of the full load torque to about 115% of the full load torque, or a gain of approximately 26+%.

A variation in the discharge resistance of the motor from an increase at starting to a decrease at pull-in therefore results in a material increase of the starting torque and a considerable increase of the pull-in torque, while at the same time maintaining the best operating characteristics of the motor during the accelerating period. With an increased starting torque there is a corresponding decrease in kv-a input and a consequent increase in torque per kv-a. The power factor of the line is improved and the motor is operated during the starting period under conditions adapted to bring out the best operating characteristics inherent in the construction of the motor.

It is to be understood that the expression "pull-in torque" is employed for the purpose of describing that torque which exists when the machine is near synchronism.

It is to be understood that the coordination of the various features of my improved method may be varied without departing from the scope of the invention, which is not limited to the particular embodiment shown and described, but which includes such modifications thereof as fall within the scope of the appended claims.

I claim:

1. In a control system for a synchronous motor having a single magnetic axis field winding, a circuit for said winding, means for inserting a field discharge resistance in the motor field circuit, means for changing the value of the field discharge resistance at at least one instant during the starting period of the motor, and means always in circuit with said field winding for reinserting the initial value of said field discharge resistance if the motor falls out of step after reaching synchronism.

2. In a control system for a synchronous motor having a single phase field winding, a circuit for said winding, means for inserting a field discharge resistance in the motor field circuit, means for changing the value of the field discharge resistance at successive instants during the starting period of the motor, and means always in circuit with said field winding for reinserting the initial value of said field discharge resistance if the motor falls out of step after reaching synchronism.

3. In a control system for a synchronous motor having a single magnetic axis field winding, a circuit for said winding, means for inserting a field discharge resistance in the motor field circuit, means responsive to the electrical condition of the motor field circuit for changing the value of the field discharge resistance during the starting period of the motor, and means responsive to the electrical condition of the motor field circuit for reinserting the initial value of said field discharge resistance if the motor falls out of step after reaching synchronism, said last named means being connected at all times in circuit with said field winding.

4. In a control system for a synchronous motor having a single phase field winding, a circuit for said winding, means for inserting a field discharge resistance in the motor field circuit at a predetermined instant during the starting period of the motor, means responsive to the electrical condition of the motor field circuit for changing the value of the field discharge resistance at at least one predetermined instant during the starting period of the motor, and means responsive to the electrical condition of the motor field circuit for reinserting the initial value of the said field discharge resistance if the motor falls out of step after reaching synchronism, said last named means being connected at all times in circuit with said field winding.

5. In a control system for a synchronous motor having a single magnetic axis field winding, a circuit for said winding, means for starting the motor with the motor field circuit in electrical condition to provide substantially the maximum starting torque, means for changing the electrical condition of the motor field circuit during the starting period to produce substantially the maximum pull-in torque, and means for returning the motor field circuit to the electrical condition providing substantially the maximum starting torque if the motor falls out of step after reaching synchronism, said last named means being connected at all times in circuit with said field winding.

6. In a control system for a synchronous motor having a single magnetic axis field winding, a circuit for said winding, means for inserting a field discharge resistance in the motor field circuit when the motor reaches a predetermined speed, means responsive to the electrical condition of the motor field circuit for changing the value of the field discharge resistance when the motor reaches another predetermined speed before synchronism and means for reinserting the initial value of said field discharge resistance if the motor falls out of step after reaching synchronous speed.

7. In a control system for a synchronous motor having a single phase field winding, a circuit for said winding, means for inserting a field discharge resistance in the motor field circuit, and means responsive to the frequency of the induced current in the motor field circuit during starting for changing the value of the field discharge resistance during the starting period of the motor.

In testimony whereof I affix my signature.

CHARLES TRUMAN HIBBARD.